US006674880B1

(12) United States Patent
Stork et al.

(10) Patent No.: US 6,674,880 B1
(45) Date of Patent: Jan. 6, 2004

(54) CONVOLUTION FILTERING OF SIMILARITY DATA FOR VISUAL DISPLAY OF ENHANCED IMAGE

(75) Inventors: Christopher L. Stork, Lynnwood, WA (US); Bradley T. Wyman, Kirkland, WA (US)

(73) Assignee: Confirma, Inc., Kirkland, WA (US)

( * ) Notice: Subject to any disclaimer, the term of this patent is extended or adjusted under 35 U.S.C. 154(b) by 593 days.

(21) Appl. No.: 09/721,913

(22) Filed: Nov. 24, 2000

Related U.S. Application Data

(60) Provisional application No. 60/167,411, filed on Nov. 24, 1999.

(51) Int. Cl.[7] .................................................. G06K 9/00
(52) U.S. Cl. ....................................... 382/128; 382/260
(58) Field of Search ................................. 382/128, 130, 382/131, 132, 164, 171, 180, 219, 220; 378/4, 21, 23, 24, 40, 62, 63; 250/583, 559.04, 559.05; 600/425

(56) References Cited

U.S. PATENT DOCUMENTS

| | | | | |
|---|---|---|---|---|
| 4,839,805 A | | 6/1989 | Pearsons, Jr. et al. ...... | 345/167 |
| 4,991,092 A | * | 2/1991 | Greensite .................... | 382/131 |
| 5,262,945 A | | 11/1993 | DeCarli et al. ............. | 600/410 |
| 5,311,131 A | | 5/1994 | Smith ......................... | 324/309 |
| 5,638,465 A | | 6/1997 | Sano et al. .................. | 382/281 |
| 5,644,232 A | | 7/1997 | Smith ......................... | 324/304 |
| 5,818,231 A | | 10/1998 | Smith ......................... | 324/309 |
| 5,825,909 A | * | 10/1998 | Jang ............................ | 382/132 |
| 6,185,320 B1 | * | 2/2001 | Bick et al. .................. | 382/132 |
| 6,249,594 B1 | * | 6/2001 | Hibbard ...................... | 382/128 |
| 2002/0045153 A1 | * | 4/2002 | Kaufman et al. ........... | 434/262 |

FOREIGN PATENT DOCUMENTS

JP          8 69533 A       3/1996   ............. G06T/7/00

OTHER PUBLICATIONS

Dasarathy, "Is Your Nearest Neighbor Near Enough a Neighbor?" in *Proceedings of the First International Conference on Information Sciences and Systems*, Patras, Greece, 1976, pp. 114–117.

Bezdek, et al., "FCM: The Fuzzy c–Means Clustering Algorithm," *Computers & Geosciences*, 10(2–3):191–203, 1984.

Xie et al., "A Validity Measure for Fuzzy Clustering," *IEEE Transactions on Pattern Analysis and Machine Intelligence*, 13(8):841–847, 1991.

Clarke et al., "Comparison of Supervised Pattern Recognition Techniques and Unsupervised Methods for MRI Segmentation," *Medical Imaging VI: Image Processing*, 1652:668–677, 1992.

Dasarathy "Adaptive Decision Systems with Extended Learning for Deployment in Partially Exposed Environments," *Optical Engineering*, 34(5):1269–1280, 1995.

(List continued on next page.)

*Primary Examiner*—Andrew W. Johns
*Assistant Examiner*—Shervin Nakhjavan
(74) *Attorney, Agent, or Firm*—Michael J. Donohue; Davis Wright Tremaine LLP

(57) ABSTRACT

A similarity value of data elements is modified to provide an improved image of an object. Using an appropriate sensor, data is collected from an object and stored as a plurality of discrete data points. The data points are compared to each other to determine how similar the data properties of one data element are to another data element. A similarity value is assigned to each of the data elements representative of the difference between the properties of the two data elements. The similarity value for each particular data element is then modified based on a weighted similarity value of the data element itself and a group of adjacent data elements. The modified similarity value is then stored for each data element and used to produce an image representative of the object.

14 Claims, 4 Drawing Sheets

OTHER PUBLICATIONS

Mussurakis et al., "Dynamic MRI of Invasive Breast Cancer: Assessment of Three Region–of–Interest Analysis Methods." *Journal of Computer Assisted Tomography,* 21(3):431–438, 1997.

Samarasekera et al., "A New Computer–Assisted Method for the Quantification of Enhancing Lesions in Multiple Sclerosis," *Journal of Computer Assisted Tomography,* 21(1):145–151, 1997.

Clarke et al., "MRI Measurement of Brain Tumor Response: Comparison of Visual Metric and Automatic Segmentation," *Magnetic Resonance Imaging,* 16(3):271–279, 1998.

Houben et al., "Distance Rejection in the Context of Electric Power System Security Assessment Based on Automatic Learning," in *Proceedings of Advances in Pattern Recognition: Joint IAPR International Workshops SSPR '98 and SPR '98,* Sydney, Australia, 1998, pp. 756–764.

Weinstein et al., "Breast Fibroadenoma: Mapping of Pathophysiologic Features with Three–Time–Point, Contrast–Enhanced MR Imaging—Pilot Study," *Radiology,* 210(1):233–240, 1999.

Kuhl et al., "Dynamic Breast MR Imaging: Are Signal Intensity Time Course Data Useful for Differential Diagnosis of Enhancing Lesions?," *Radiology,* 211(1):101–110, 1999.

Orel, "Differentiating Benign from Malignant Enhancing Lesions Identified at MRI Imaging of the Breast: Are Time–Signal Intensity Curves an Accurate Predictor?," *Radiology,* 211(1):5–7, 1999.

Liney et al., "Dynamic Contrast–Enhanced MRI in the Differentiation of Breast Tumors: User–Defined Versus Semi–Automated Region–of–Interest Analysis," *Journal of Magnetic Resonance Imaging* 10:945–949, 1999.

Hylton, "Vascularity Assessment of Breast Lesions with Gadolinium–Enhanced MR Imaging," *MRI Clinics of North America,* 9(2):321–331, 2001.

Taxt, T. et al., "Multispectral Analysis of Uterine Corpus Tumors in Magnetic Resonance Imaging," *Magnetic Resonance in Medicine,* 23:55–76, 1992.

Taxt, T. and A. Lundervold, "Multispectral Analysis of the Brain Using Magnetic Resonance Imaging," *IEEE Transactions on Medical Imaging,* 13(3):470–481, Sep. 1994.

Parker, G.J.M. et al., "MRIW: Parametric Analysis Software for Contrast–Enhanced Dynamic MR Imaging in Cancer," *RadioGraphics* 18(2):497–506, Mar.–Apr., 1998.

Pham, D.L. and J Prince, "Partial Volume Estimation and the Fuzzy C–means Algorithm,".

Bezdeck, J.C. et al., "Review of MR Image Segmentation Techniques Using Pattern Recognition," *Medical Physics,* 20(4):1033–1048, Jul./Aug. 1993.

Reiss, A.L. et al., "Reliability and Validity of an Algorithm for Fuzzy Tissue Segmentation of MRI," *Journal of Computer Assisted Tomography,* 22(3):471–479, 1998.

Vannier, M.W. et al., "Multispectral Analysis of Magnetic Resonance Images," *Radiology,* 154(1):221–224, 1985.

Clark, M.C. et al., "Automatic Tumor Segmentation Using Knowledge–Based Techniques," *IEEE Transactions on Medical Imaging,* 17(2):187–201, Apr. 1998.

Clarke, L.P. et al., "MRI Segmentation: Methods and Applications," *Magnetic Resonance Imaging,* 13(3):343–368, 1995.

"Spatial Filtering," pp. 189–195.

* cited by examiner

CONVOLUTION FILTERING OF SIMILARITY DATA FOR VISUAL DISPLAY OF ENHANCED IMAGE

CROSS-REFERENCE TO RELATED APPLICATION

This application claims the benefit of U.S. Provisional Patent Application No. 60/167,411 filed Nov. 24, 1999.

TECHNICAL FIELD

This invention is in the field of modifying a visual display of an object and more particularly, to a convolution filter for a visual display.

BACKGROUND OF THE INVENTION

It is frequently desired to provide to a user an image of an object on a visual display. The object whose image is to be displayed may be a common physical object, such as a building, a landscape at a certain time of day, tree, or other living objects. In the medical field, it is frequently desired to provide images of all or different parts of an animal or the human body, such as the spinal cord, brain, bone, muscle, or other tissue. For medical diagnostic purposes, it is especially important to correctly identify abnormal tissue such as a tumor, cancerous growth, or other tissue of interest. These diagnostic purposes are often accomplished with medical images.

The images of the object may be collected by a variety of different modalities and stored using different techniques. In the medical technology field, it is common to collect images using a variety of techniques including magnetic resonance imaging (MRI). Various types of information are collected using such medical devices. The data are collected, stored, and then formed in an image to be viewed by a user, most often a medical diagnostic team which may include a radiologist and the patient's primary caregiver. As a part of the process of generating the image data and the resulting image, a convolution filter may be applied to the initial data from the imager to smooth the data and reduce the noise.

Within the medical imaging field, having an accurate and precise image of the true nature of an object has particular importance. Frequently, MRI is used to locate abnormal tissue in a human body. The abnormal tissue is, in many instances, a tumor which may be either malignant or benign. It is especially critical to determine whether the tumor is malignant or benign early in the medical diagnostic process. In the event the tumor is determined to be malignant, it becomes of particular importance to understand the extent the tumor has spread to other parts of the body, known medically as metastasizing. In the event the tumor has not yet metastasized, a certain treatment regimen is preferred and frequently is beneficial in ridding the body of the cancer. On the other hand, in the event the cancer has metastasized, a different treatment regimen and medical procedure is called for, often to more aggressively treat the cancer to increase the likelihood of removing all the cancerous tissue from the patient's body completely so that health may be restored to the patient. Such images become particularly important when the cancer is in such areas as the brain, the lungs, the lymph system, or other parts of the body which are not easily examined by or treated with surgery.

In the case of medical imaging, it is also important that false positives be minimized so as to not over-treat the patient. In the event the image appears to show the cancer in numerous places in the body, it is especially critical to ensure that healthy non-cancerous tissue has not been indicated as cancerous. A false positive causes an improper medical diagnosis and results in a different or more aggressive treatment than may otherwise be needed. Accordingly, within the medical field it is particularly important to have an image in which the abnormal growth within the human body is properly and correctly identified, including all the locations within the body, while ensuring that no healthy tissue is mistakenly identified as an abnormal growth.

SUMMARY OF THE INVENTION

According to principles of the present invention, a method is provided for modifying the value of data elements which have been stored as representation of an object whose image has been stored in memory. Using the appropriate sensor(s), data are collected from the object. A plurality of discrete data elements that represent corresponding locations in the object under investigation are stored in memory. A first value is assigned to each of these sensor-derived data elements, the first value being representative of a property of the object under examination. If multiple data sets are generated from the imaging of the object, multiple first values will exist for each corresponding location in the object. The first values are associated with the discrete data elements, which are organized in a pattern such that the data elements adjacent to each other in the pattern represent adjacent locations within the object. At this point additional modification of the first data values may occur via such filters as convolution filters or high pass or low pass filters which achieve smoothing and denoising of the resulting image. The result of this process will be second values for each discrete data element.

Next, a new value, called the similarity value, is assigned to each of the data elements, this value being representative of the similarity of one data element to a standard or reference set of data elements that represent physical properties of the object under examination. The similarity values are associated with the discrete data elements, which are organized in a pattern such that the data elements adjacent to each other in the pattern represent adjacent locations within the object. The similarity value of a particular data element is then modified based on a weighted similarity value of the data element itself and a group of adjacent data elements. This process is known as convolution filtering and yields a modified similarity value. The modified similarity value is stored for each data element as it is modified. An image is then formed which is viewable by a user that is composed of an array of discrete visual pixels whose display properties are based on the modified similarity values of the data elements.

According to one embodiment of the present invention, a convolution filter is applied to the sensor-derived data as stored in a memory. The convolution filter is preferably applied as a final step in any multi-step processing of the data. In a first sequence of steps, the sensor-derived data are collected and stored in a memory. The sensor-derived data are then organized according to the various properties of the tissues under examination in the case of medical images. A region of interest, containing at least the reference tissue or standard tissue, is designated by the user. A training set of data elements is created within the selected region of interest. One or more of the training set data elements are selected by the user to accurately reflect the properties of the tissue for which further searching is to be performed. After the selection of the training set, the remaining data elements representing the object are treated as test samples which are compared to the selected training set. The Euclidean distance between each of the test samples and each member of the selected training set is calculated and a similarity value is obtained, representative of the shortest distance between any member of the training set and the test sample. This similarity value provides a numerical measure of the relative similarity between the test sample and the training data set. The similarity value is stored in a memory location so that it may be used to create an image.

After the similarity data are created, the convolution filter of the present invention is applied. The convolution filter compares the similarity value of one data element with the similarity values of adjacent data elements and, applying one or more weighting factors, modifies the similarity value of the data element under examination. This convolution filtering is performed on an element-by-element basis for the entire array. An image is then displayed, based upon the modified similarity values, that provides a more accurate representation of the properties of the object.

According to one embodiment of the present invention, the convolution filter applied is a typical 5×5 square array weighted according to a gaussian formula in which the standard deviation, sigma, equals 1. According to other embodiments of the present invention, the convolution filter applied may be a windowing in the Fourier domains, an isotropic diffusion filtering, or a probability filter which makes use of the fact that adjacent pixels in an image normally belong to similar tissue. A Markov field-type filter may be used which integrates spatial information into the similarity data. Other convolutions which rely on the spatial properties of the human body, such as symmetry of the brain or other body parts, may also be used to increase the clarity of the image and confidence in the classification of the tissue.

DETAILED DESCRIPTION OF THE INVENTION

Figure 1:
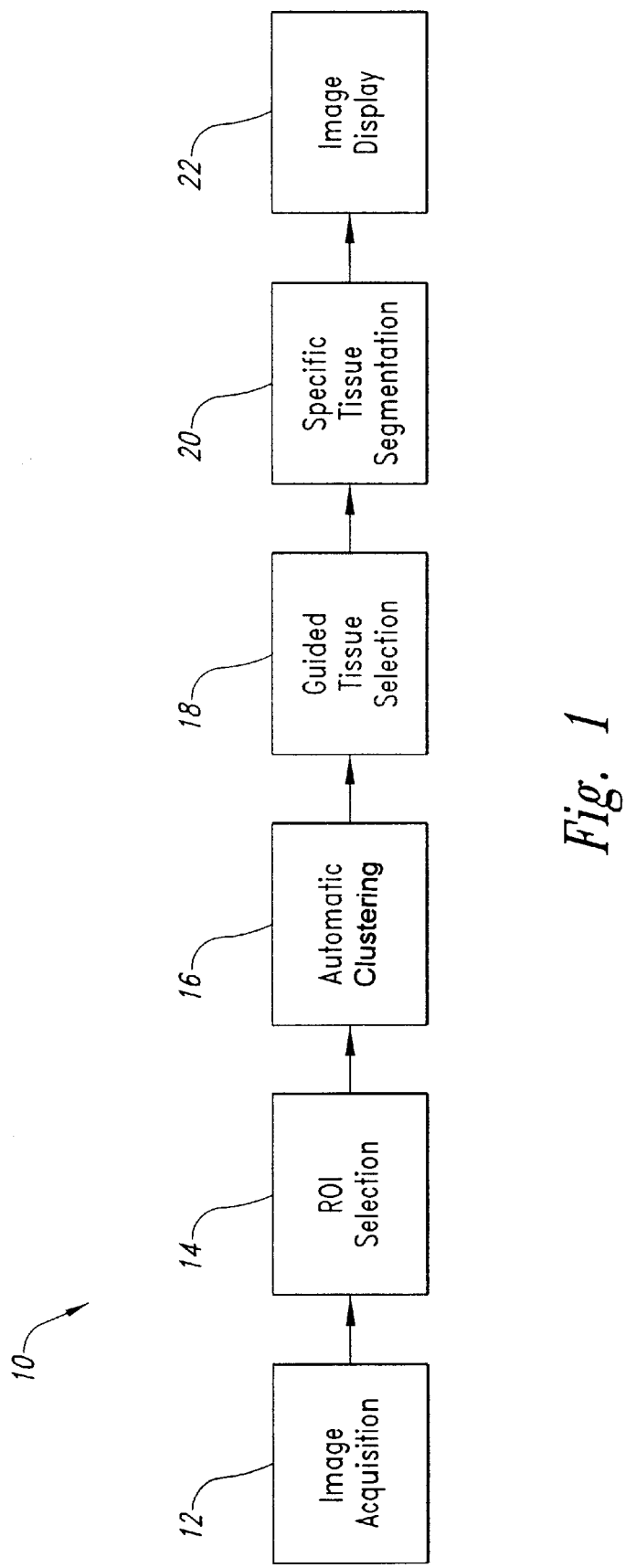
FIG. 1 is a block diagram of the various steps of the image acquisition and display procedure.

FIG. 1 illustrates an overview of the general process in which the invention is carried out. Image acquisition occurs in step 12, which is the initial acquiring of the data which represents the object under examination. As discussed in the background, the image may be of any object for which further study is desired. For example, according to the present invention the object may be of a type normally occurring in nature such as a landscape, a plant, or perhaps even a sunset. Since the present invention is highly sensitive to recognize the differences between two very similar features in an object, it is particularly useful to image a single object and locate features of the object which are similar to each other and distinguish them from features in the same object which are different from each other. The present invention is particularly applicable if the object under examination is a patient and the image is being made for a medical diagnosis purpose of types of tissue within the patient.

It is currently known in the art how to obtain and refine images using magnetic resonance imaging techniques such as disclosed in U.S. Pat. No. 5,311,131 titled MAGNETIC RESONANCE IMAGING USING PATTERN RECOGNITION; U.S. Pat. No. 5,644,232 titled QUANTITIZATION AND STANDARDIZATION OF MAGNETIC RESONANCE MEASUREMENTS; and U.S. Pat. No. 5,818,231 titled QUANTITIZATION AND STANDARDIZATION OF MAGNETIC RESONANCE MEASUREMENTS, all incorporated herein by reference. The various techniques for obtaining a medical image using NMR or MRI techniques are described in detail in these patents and therefore need not be repeated here. These patents are provided as background information and may be studied in more detail to understand a preferred environment and one possible specific use of the present invention if desired. The image acquisition technique is described in these patents as suitable for use with the present invention in order to acquire and store the images called for in step 12. Other types of medical image acquisition may also be used, including x-rays, positron emission tomography, computed tomography, various radiological techniques, ultrasound, or other acceptable techniques.

Once the image is acquired and stored in memory it is therefore desired to perform a further study of the image for medical analysis and perhaps diagnostic determinations for cancerous sites which may be present within the medical patient under examination. In order to proceed to the next step, a user, usually a medical technician or physician, selects a region of interest for which further examination is desired, step 14. This region of interest may be selected by indicating a desired tissue type on a screen using a computer mouse, forming a box around a target site, such as a known tumor site, or some other technique by which a user may designate a region of interest.

After a region of interest is designated, clustering within the region of interest is carried out as shown in step 16. Essentially, the number of clusters corresponds to the number of different tissue types in the region of interest. This provides a segmentation of the tissue into different classes within the region of interest. If the region of interest is quite small and specific, there may be only a single type of tissue within the region of interest. Alternatively, there may be two or more types of tissues within the region of interest and clustering will provide a segmentation of the different types of tissues found within the region of interest which has been designated. Since the region of interest is relatively small compared to the entire image, the classification of tissue will have fewer types of tissues and can more clearly segment one tissue type from another within the region of interest.

According to one embodiment, the clustering performed in step 16 is an automatic clustering which is a form of unsupervised segmentation. A fuzzy clustering mechanism is carried out in which the number of clusters used for a segmentation are automatically determined using the Xie-Beni Fuzzy Validity Criterion. The Xie-Beni Fuzzy Validity Criterion determines the number of clusters based on the compactness and separability of the different types of tissues within a particular region. Such fuzzy clustering is well known in the art and has been published, see for example the article by X. L. Xie and G. Beni in *IEEE Transactions on Pattern Analysis and Machine Intelligence*, Volume 13, page 841–847 (1991). Alternatively, the clustering may be accomplished using non-automatic methods.

The user then performs a guided tissue selection in step 18 as will now be described according to the present invention. After the clustering of tissues is performed, the user selects one or more clusters which represent a type of tissue which is of particular interest for further study. In standard use of the present invention, the type of tissue being selected will normally be a tumor which is suspected of being malignant. In some applications, the tumor may have previously been confirmed as a malignant tumor and it is desirable to know the exact shape of the tumor and whether the cancer has spread outside the initial tumor boundaries. It is also desirable to know whether the cancer is present in other portions of the body.

According to the present invention, a cluster representative of tissue is selected which is known to be the specific tissue of which further examination is desired. In the present example, it will be assumed that a tumor is selected. The cluster corresponding to the specific tissue is selected. The selected cluster comprises a training set of individual data elements which are representative of the type of tissue for which further search and study is desired. A comparison is then carried out between each member of the training set and each data element outside of the training set. Preferably, the data elements which compose the entire original image(s) in step 12 are compared to the training set to determine whether or not any of the tissue under study is located outside of the region of interest, and in particular, whether it is located in other portions of the body.

Any of known acceptable techniques may be used for comparing the training set of data elements to the other set of data elements which represent the object under consideration. One particular acceptable comparison technique will be summarized, which will be described in more detail even though other techniques may be used.

A summary of an acceptable technique to perform the specific tissue segmentation of step 20 is as follows. Each sensor-derived data element under consideration has one or more properties which describe a corresponding portion of the object which the data element represents. Each of these properties has a numerical value. For example, if the image which has been acquired is an MRI image, then the properties of each data element may include such features as the longitudinal relaxation factor, T1, or the transverse relaxation factor, T2, weighted T1 or T2 images, the proton density space, or other parameters which are normally measured in an MRI, as is known in the art. Therefore, each of the data elements known in the training set has the numerical value which is related to each of the properties that provides a description of the data element. Each data element will thus be described by several different numbers, one number for each of the properties stored. The data is thus multivariate. The numerical values may be thought of as defining the position of a data element in multi-dimensional space and reflecting the magnetic resonance properties of the tissue corresponding to that location. Namely, each one of the parameters represents one of the dimensions for the location of the object in a Euclidean geometry field. If two properties of an object are stored for each data element, then the field becomes a two-dimensional Euclidean plane. If three parameters are stored, then the data element can be considered as being at a location in a three-dimensional Euclidean field. Similarly, if four physical parameters are represented, then the object may be considered as being at a location in a four-dimensional Euclidean field. Each member of the training set, therefore, has a location within the multi-dimensional Euclidean field.

The numerical values associated with each member of the training set are compared to the numerical values associated with every other data element of the object under investigation. Since the numerical values of the data element are related to the magnetic resonance properties of the object under investigation for each data element, its location in the multi-dimensional Euclidean field is related to the magnetic resonance properties of the object. In the comparison of the training set to the test set, the closer that two data elements are to each other within the multi-dimensional Euclidean field, the more similar they are. Thus, the distance between the two data elements with respect to each other becomes an accurate and reliable measure of the similarity of the magnetic resonance properties of the object represented by the data elements. (Data elements outside the training set are referred to as test samples.)

The distance between data elements in the training set and each data element outside the training set is determined and a similarity value is assigned to that data element.

The distance from a data element in the training set and a test sample data element can be represented as a numerical value which provides a similarity for the test sample data element. The numerical value of this similarity represents the similarity between the test sample and the training set. The smaller the distance, the more similar the data elements are to each other. Thus, a distance of 0 indicates the data elements are so similar to each other than they may be considered identical and members of the same class. Higher distances indicate less similarity. Depending on the scaling used, the numerical distance value may be a single digit number, such as a number one through ten. Alternatively, it may have many digits such as a seven- to ten-digit number. For some embodiments, the distance number is expected to be sufficiently large for nearly all test samples in the data set, that the logarithmic value may be taken after the distance value is obtained in order to normalize the distance values. The absolute distance value is not so important as the relative distance value compared to the distance for other data elements in the test set and also the distance of a training data element when compared to other elements in the training data set.

In one embodiment, the actual similarity values may be calculated as follows.

Data collected during the course of an MRI study can be organized into a four-dimensional array, $\underline{E}_{I \times J \times K \times L}$, where I designates the number of rows within the array, J the number of columns, K the number of sensor-derived properties, and L the number of anatomical slices within the study. The K sensor-derived properties are the features utilized in tissue segmentation. The property value for a particular array element, $f_{ijkl}$, can be accessed by specifying a row-column-sequence-slice address, where i=1, . . . , I is an index indicating the row position, j=1, . . . , J is an index indicating the column position, k=1, . . . , K is an index for the sensor-derived property, and l=1, . . . , L is an index for slice number. Each data element in the array can be thought of as occupying a spatial location in a 2-, 3-, 4-, 5- or other multi-dimensional field. Such a data element that occupies a volume in space may be referred to as a voxel. For a 2-dimensional screen image, each display element is usually referred to as a pixel.

In one implementation of MR segmentation, the user designates a set of samples, $F_{N \times K}$, representing a single tissue class. Here, N designates the number of samples in the training set. Having identified these training samples, supervised segmentation is performed utilizing the nearest neighbor method. The classical single nearest neighbor method can be used at this stage, which is a nonparametric decision rule which classifies an unknown test sample as belonging to the same class as the nearest sample point in the training set, as described in a publication by Gose et al. in 1996. The degree of similarity between a test sample, $f_{test}$, and a training sample, $f_n$, can be defined in terms of their Euclidean distance in K-dimensional feature space $$d(f_{test}, f_n) = \sqrt{\sum_{k=1}^{K} (f_{test,k} - f_{nk})^2}.$$

The distance from the test sample to each training sample in the set is measured, and the minimum of these distances is selected. Namely, the similarity value for the test sample is based on how close it is to the nearest one of the samples in the training set. An output of nearest neighbor segmentation contains similarity data in a three-dimensional similarity array, $\underline{D}_{I \times J \times L}$, containing the minimum distance at each voxel position (i,j,l).

After the similarity values are obtained, it may also be desired, in some embodiments, to segment the tissues into different classes. According to this embodiment, the different tissues are ranked based on how closely they correlate to the training set of data elements. If they are extremely close, they may be assigned different color patterns or intensities which indicate that they are more similar to the training class of data elements than they are to other classes of data elements in the object even though they are not within the training set itself. In some embodiments, the specific segmentation, step 20, is not performed and does not form a part of the present invention. Rather, this is an optional feature which may be performed if desired.

Figure 2:
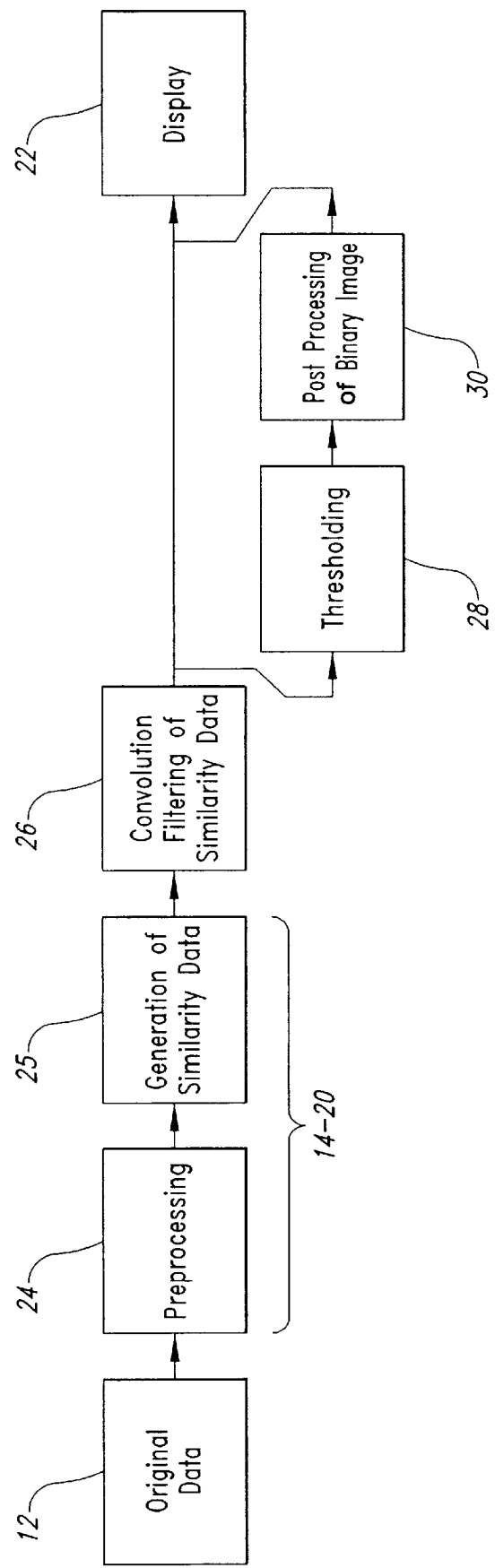
FIG. 2 is a block diagram of the generation of similarity data and convolution processing according to the present invention.

FIG. 2 illustrates the process steps for carrying out a convolution filter according to the present invention. The original data is obtained in step 12, which corresponds to step 12 of FIG. 1. Preprocessing of the sensor-derived data is performed in step 24. There are many data processing techniques known in the art to filter collected data, among these is convolution filtering acting on the raw data itself.

In one embodiment, the preprocessing 24 and generation of similarity data 25 corresponds to steps 14–20 of FIG. 1 as has been described. In alternative embodiments, the preprocessing 24 and generation of similarity data 25 may use other techniques which are acceptable in the art.

According to the present invention, the convolution takes place after the generation of the similarity data and thus provides unique advantages which have not been previously possible in the prior art. After the completion of step 25, similarity data has been obtained and stored in a first memory. The similarity data is the representation of an object using the similarity values of the plurality of data elements that correspond to locations in an object. The similarity of each data element is representative of the magnetic resonance properties of a designated region of interest in the object as compared to the magnetic resonance properties elsewhere in the same object or in another object for which the same imaging modality and protocol have been used. In one embodiment, the numerical value of the similarity describes how closely the magnetic resonance properties of one data element correspond to the magnetic resonance properties of a training set of data elements, a lower distance being more similar.

The similarity values are stored in a memory and organized in such a fashion that the data elements that are logically adjacent to each other correspond to adjacent locations within the object under examination. In some computer designs, these will be adjacent locations within the memory of a computer. Alternatively, the locations may merely be logical addresses and the data elements need not be stored adjacent to each other within the physical memory. Thus, from a functional standpoint the data elements are seen to be adjacent even though, strictly speaking, they may be stored in any desired fashion.

The convolution filtering of step 26 is then carried out in which the similarity value of a selected data element is modified based on the similarity values of adjacent data elements. A significant advantage is obtained by carrying out the convolution filtering on the similarity data. The modification of the similarity value of a selected data element is carried out as follows. A data element will be referred to as a pixel in this example, since it will be displayed on a two-dimensional computer screen, but of course, the example and invention are applicable to a voxel or other element in multi-dimensional space. The similarity value of the selected pixel is modified by a convolution kernel of a given size and shape. The convolution kernel defines the set of filter weights applied to the similarity value for the selected pixel and the similarity values of its spatially adjacent pixels. One can visualize the convolution process by overlaying the convolution kernel on the similarity data matrix, with the center filter element of the convolution kernel commonly aligned over the similarity value for the selected pixel. The modified similarity value is calculated by multiplying the similarity values for the selected pixel and its spatially adjacent pixels by their corresponding convolution filter weights and then summing the results. In one embodiment, the convolution kernel is composed of a gaussian-distributed 5×5 matrix. Alternatively, the kernel may be hexagonal, circular, or other shape which defines the modification kernel which will be applied to the selected pixel.

Figure 3:
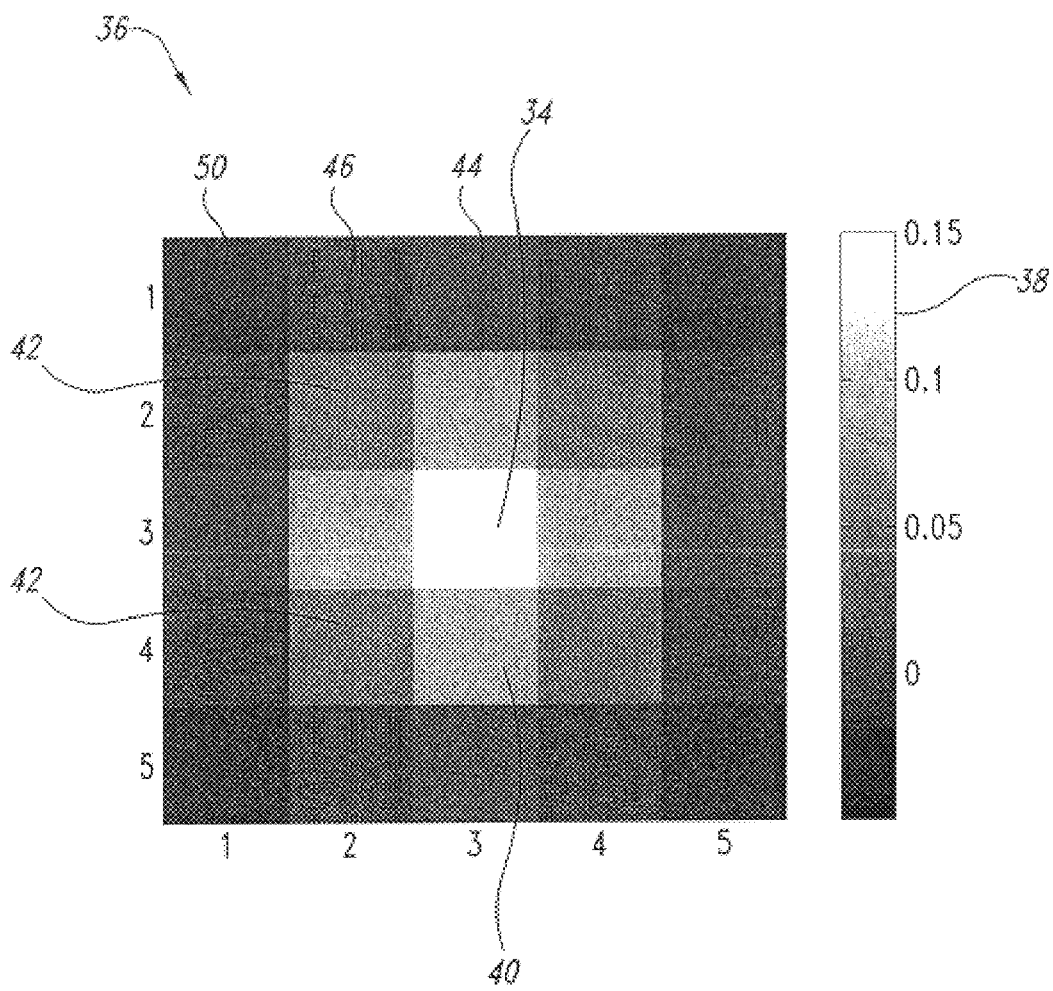
FIG. 3 is one example of a convolution filter of the gaussian type in which sigma is equal to 1.

FIG. 3 illustrates one technique for carrying out the convolution filter on the similarity data using a 5×5 matrix gaussian convolution filter 36 in which the standard deviation, sigma, is equal to 1. In this particular figure, shown in FIG. 3, each pixel location overlaid by the convolution kernel 36 is assigned a weighted value. The weighted value is based on its distance from a center pixel 34, which in this example, is the selected pixel whose similarity value is to be modified. Each of the pixel locations overlaid by the kernel are provided a weight based on a gaussian distribution as shown in the legend 38 on the right-hand side of the gaussian kernel 36. The central pixel 34, is given the heaviest weight. Adjacent pixels are given a lower weight based on their distance from the center of the selected pixel 34.

Viewing the legend 38, adjacent the gaussian kernel 36, it can be seen that the central pixel is white and thus will have a weighted value slightly higher than 0.15. According to one embodiment of the present invention, the central pixel 34 has a weighted factor of 0.162 though, in some embodiments, it may have a weight factor of 0.2, 0.5, or some other value when it is desired to more heavily weight the original similarity value of the selected pixel itself. For a more narrow gaussian curve, a lower sigma may be selected, less than 1, such as 0.6, 08., etc., which would give a greater weight to the more centralized pixels. A higher sigma may also be chosen, such as 1.5, 2, etc. A higher sigma will smooth the data, at the risk of not being able to detect very small tumors.

The next four, most adjacent pixels 40, are weighted with the next highest value. In the embodiment shown in FIG. 3, this value is approximately 0.1 for each of these four pixels. The exact value, of course, is shown in the legend 38 to the right-hand side and has a raw numerical value of 0.0983 in the embodiment shown, though other values may be used. In summary, the similarity value of the central pixel 34 is multiplied by its weighted factor, in this case, ~0.16. The similarity value of each of the next closest to adjacent pixels 40 is multiplied by their corresponding weighted factor, in this case ~0.1, to obtain a product for each of the four similarity values for the four pixels 40. The resultant product of these four multiplications are then added to the product of the multiplication of the weighted similarity value for the central pixel 34 to obtain a sum. The remaining adjacent pixels 42 as well as the other pixels, such as 44, 46, and 50, overlaid by the convolution kernel 36, have their similarity values multiplied by their respective weighted factors. The weighted factor, of course, is lower, depending on the distance that the particular pixel is from the central pixel 34. For example, the weighted factor for a pixel at location 42, according to this embodiment, is ~0.06, whereas the weighted value for pixel 44 is ~0.02 and the weighted values for pixels 46 and 50 are 0.013 and 0.003, respectively. Again, the exact values can be seen by comparing the convolution filter 30 to the legend 38.

After all the products of the weighted values multiplied by the respective similarity data for the pixels that they represent have been calculated, all the products are added together to obtain a resultant sum for all products in the entire convolution filter. A new similarity value is obtained. According to the present invention, the similarity value of the central pixel 34 is replaced by the similarity value which has been calculated as the sum of the products of all the pixels overlaid by the convolution kernel. This convolution is now completed for this pixel 34.

A new pixel is then selected to become the central pixel 34 on which the convolution will be performed. The convolution kernel is successively overlaid on each pixel in the entire image. The similarity values overlaid by the 5×5 gaussian block under the convolution kernel are multiplied by their corresponding weights defined by the kernel. This process is carried out for every pixel, the results are summed and the value which is calculated replaces the original similarity value at the center pixel. This has the effect of integrating information from the neighboring pixels into the similarity for each pixel. As has been explained, pixels further from the center pixel are weighed less than those which are closer to the center pixel. The image is then shown on the display, step 22.

The results of the convolution filtering can be provided to the user by a number of acceptable techniques. Of course, the actual raw numerical data can be provided in the form of a printout or some other visual display. Providing the actual similarity value data itself may be useful in some environments and may be beneficial if a physician is making a detailed determination for particular tissue. However, for most users having a numerical printout of the similarity values themselves will not be as useful as having an image which represents the convolved similarity values. Another, more preferred approach for providing the results of the convolution filter is in the form of a single color overlay layered on the corresponding gray scale MR image. Thus, the image may be a gray scale in which the pixels have different values in a gray scale image. The modified similarity data is thus applied to the pixels on such a gray scale image to produce a new image which more clearly illustrates to the viewer the locations of the tumor or other tissue under investigation.

As a further alternative, the convolution filter data may be displayed in a multicolor display with different colors used to represent the different degrees of similarity. The tissue which is most similar to the training set itself may be displayed with a first color, such as red. The tissue which is next most similar to the training set, may be displayed with another color other than red. The further next most similar classes of tissue after this class may be then displayed with a third color different from the prior two classes. Thus, the image shown using the results of the convolution filter can be seen in a color display in which the different colors of pixels are clearly seen to represent different degrees of similarity to the training set tissue.

In FIG. 2, further visual display alternatives may be carried out on the image after the convolution filter has been applied. Rather than providing the modified similarity data to a display 22 directly from the convolution filter 26, as has just been described in a first embodiment of the present invention, the data may instead be compared to a threshold in a thresholding step 28, followed by a post-processing step 30 to create, for example, a binary image. According to the thresholding step 28, all pixels whose similarity values are above a certain threshold are deemed to belong to the same class of tissue. If the similarity value is below the threshold, then the tissue is determined to not be within that class of tissue of interest and is rejected. With the creation of a binary image, all tissue which is determined to be within the class of interest is shown having the very same color and characteristics as all other tissues within the class of interest. Those pixels which are not within the class of interest are shown having a distinctly different color, whether the color is on a gray scale or actual colors in the spectrum. Thus, the binary image is more likely to have sharply defined edges approaching that of a binary image where each pixel is either within the class of interest or outside of the class of interest, thus, bringing more starkly into contrast the regions of tissue in the image under study. If a gray scale image is used, pixels within the class can be made a color at one end of the spectrum, either black or white, and all other pixels can be shown in their gray scale color. For example, if every data element that has a similarity value above a threshold is made black, this is overlaid on top of the MRI image to more clearly show those regions that are very similar to each other. Following the thresholding in step 28, the binary image post-processing can be carried out in step 30 so as to further smooth and filter the binary image. Thereafter, the binary image of step 30 is provided to display 22 for a user to view. Thus, the convolution filter may be applied on data, just prior to thresholding followed by the production of a binary image if desired.

According to one embodiment, when each pixel's similarity value is modified by the convolution filter, the modified similarity value is stored in a second memory and its original similarity value is retained in a first memory and is used for all subsequent convolution calculations. Namely, if a first pixel had a convolution applied and its similarity value modified, this similarity value is stored in a separate memory and the original similarity value is retained in a first memory. The convolution kernel is then applied to the next adjacent pixel to the one whose similarity value has just been modified. The original similarity data which has been stored in the first memory is used for the convolution in order to modify another pixel which is now at the center of the convolution kernel. Thus, each time the convolution kernel is successively overlaid on different pixels, only the original similarity value from each of the pixels is used to modify the similarity value of the central pixel. According to this technique, the similarity values are changed only based on their relationship to the original values and no modifications are obtained based on some of the pixel's similarity data previously being changed.

In an alternative approach, once a pixel has had its similarity value modified, then the modified similarity value is used in subsequent convolution filtering of pixels adjacent to itself. This will have the effect of increasing the strength of that particular pixel relative to the others since its similarity value has already been modified based on pixels adjacent to itself. The latter approach, though generally not preferred, may be used in some embodiments when it is desired to attempt to make the similarity values as uniform as possible.

Other types of convolution filtering may be used besides the 5×5 matrix gaussian-distributed convolution filter as described with respect to FIG. 3. For example, windowing in the Fourier Domain may also act as a low-pass filter. A general description of windowing in the Fourier Domain can be seen from a standard image processing textbook and, therefore, it need not be described in detail here.

Since tumors, and generally other tissues in the human body, generally are viewed in an image as a number of adjacent pixels, neighboring pixels can provide information to increase the confidence of a segmentation or division of data into classes. The convolution filter of the present invention is found to significantly improve the readability of images and to increase the proper labeling of the tumor while at the same time decreasing the false labeling. Thus, similar-type tissues are more easily seen in an image following a convolution filter of the present invention while at the same time, false positives are more likely to be properly interpreted because they are either removed or reduced in size.

Figure 4A:
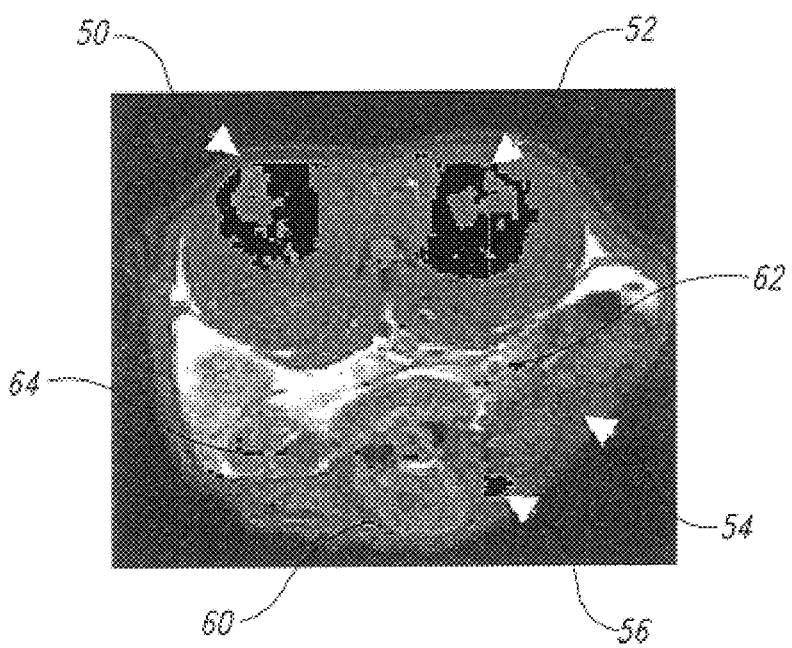
FIGS. 4A and 4B are examples of the segmentation results for tumor in an MR image both before and after the convolution filter has been applied according to the present invention.
Figure 4B:
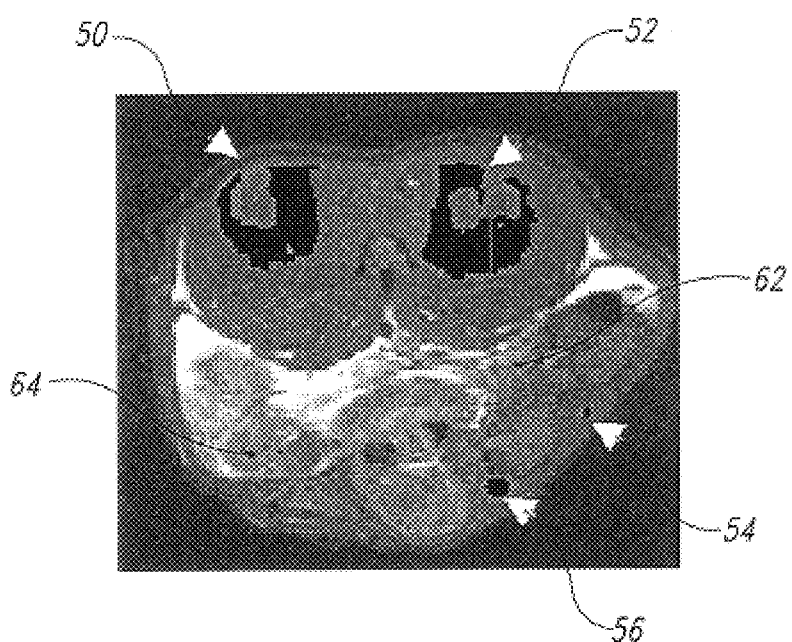

FIGS. 4A and 4B illustrate the improvement obtained of the present invention when a convolution filter has been applied. In FIG. 4A, four white arrows 50, 52, 54, and 56 are shown. Each of these arrows point to a known tumor in the subject under examination based on a necropsy performed after the MRI image was produced. It should be noted that the large tumors pointed to by arrows 50 and 52 contain at their center necrotic tissue, dead cells which were formerly part of the living cancerous tissue.

In performing segmentation for this example, a known tumor site was used to establish a training set and a similarity value was calculated for each pixel in the object. A binary segmentation result was obtained by applying a threshold, such that pixels whose similarity values equaled or exceeded the given threshold were labeled in black in FIGS. 4A and 4B. These black pixels, identified as being highly similar to tumor, were overlaid on top of a conventional MR image.

The image in FIG. 4A, presenting the binary segmentation results achieved without convolution filtering, contains a number of false positives. For example, in a central region 60 is a falsely labeled black area which may be considered by some physicians to be tumor. Other false positives 62 and 64 show up at various other locations in the image. Of some importance, one known tumor site, pointed to by arrow 54, is not labeled black, indicative of a false negative site in the current image. The tumor, while known to be present at location 54 based on a necropsy performed on the subject after the MRI was taken, was not identified using the standard MR image technique of the prior art.

FIG. 4B illustrates a binary format of a gray scale image of the same MR image data shown in FIG. 4A following the convolution filtering according to the present invention. Namely, the data elements which compose the MR image were subjected to a similarity data value analysis as described with respect to the present invention. After a similarity value was obtained for each of the data elements that correspond to the pixels of the figures, the convolution filter was applied to the similarity data and the similarity value of each pixel was modified based on the weighted value of adjacent pixels. A threshold was then applied and all pixels with similarity values greater than or equal to the threshold were displayed in black. Pixels with similarity values less than the threshold were shown in a gray scale pattern based on their original magnetic resonance characteristics. This had the advantageous effect of removing or reducing a number of false positives while more clearly delineating and illustrating the actual tumor tissue itself. For example, viewing FIG. 4B the tumor locations at 50, 52, and 56 can more clearly be seen and understood. Of some importance, the tumor tissue at location 54 is now visible as the black segment pointed to by arrow 54. By modifying the value of each pixel based on the weighted values of its adjacent pixels the overall result was to reinforce the effect of adjacent tumor containing pixels such that the site 54 may now clearly be seen as tumor tissue.

The convolution filter also had the advantageous effect that labeling associated with a number of false positive tumor sites was completely removed from the image. Other false positives were more clearly shown to be false positives and thus would not distract the physician in his analysis. For example, black labeling associated with the false positives at the bottom region 60 completely disappeared. Nearly all false positive labeling in the entire image was eliminated. Some labeling associated with false positives prior to convolution filtering, such as those shown at regions 62 and 64, were significantly decreased in size after use of the convolution filter of the present invention. The physician can thus be more confident that these areas are not tumor but instead represent false positives since they became smaller in size due to the convolution filter, instead of being enlarged or remaining the same size as happened with the actual tumor tissue at 50, 52, 54, and 56.

The present method obtains advantageous results by the application of a convolution filter as a post-processing step of the similarity data after segmentation. There are reports in the literature of convolution filters which have been used in the processing of initial sensor-derived image data, however, within the knowledge of the present inventor, such convolution filters have not previously been used on the post-processing of similarity data for improving segmentation.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claim is:

1. A method of modifying data, comprising:
   storing in a first memory the representation of an object using a plurality of discrete data elements that represent corresponding locations in the object;
   assigning a similarity value to each data element, the value of the similarity being representative of a property of the object;
   organizing the similarity values of the discrete data elements into a pattern in which data elements that are adjacent to each other in the pattern represent adjacent locations within the object;
   modifying the similarity value of a selected data element based on the weighted similarity value of itself and a plurality of adjacent data elements;

storing the modified similarity values of the data elements; and forming an image viewable by a user that is composed of a plurality of discrete visual pixels whose display properties are based on the modified similarity values of the data elements.

2. The method according to claim 1 wherein all data elements that are located within three data elements of the selected data element are considered to be adjacent.

3. The method according to claim 1 wherein all data elements that are located within two data elements of the selected data elements are considered to be adjacent.

4. The method according to claim 1 wherein the weighted value of one adjacent data element compared to another adjacent data element is based on a gaussian pattern of weighting of the data elements.

5. The method according to claim 1 wherein the step of modifying the value of the selected pixel comprises:

forming a convolution kernel having the selected pixel and the plurality of adjacent pixels therein;

multiplying the similarity value of the selected pixel and the adjacent pixels by the weighted value of each pixel in the convolution kernel to obtain a set of first products;

summing the products of all pixels in the convolution kernel to obtain a weighted similarity value; and storing the similarity value of the selected pixel with the weighted similarity value.

6. The method according to claim 5 wherein the sum of all weighted factors is equal to one.

7. The method according to claim 1, further including:

forming a training set of data elements;

forming a testing set of data elements; and comparing each test data element to the training set of data elements to obtain a similarity value for the test data element.

8. The method according to claim 1, further including:

storing the similarity value of each data element in a first memory; and storing the modified similarity values of the data elements in a second memory.

9. The method according to claim 1 wherein said step of organizing the similarity values of the discrete data elements is carried out by organizing the storage location of the discrete data elements in the first memory.

10. The method according to claim 1 further including creating a binary image of the MR data comprising:

setting a threshold for the similarity value;

creating a class of data elements, including all data elements having a similarity value greater than the threshold value.

11. The method according to claim 10 further including:

displaying, as a single color, all pixels representative of data elements within the selected class; and displaying pixels not within the selected class using a different color than those within the selected class.

12. The method according to claim 11 wherein the color selected is one color within a gray scale color scheme, the entire image being shown on a gray scale.

13. The method according to claim 11 wherein the color selected for the class of interest is black and all other tissues are shown on a gray scale pattern having a color different from black which are not within the class of interest.

14. The method according to claim 11 wherein the color selected is from the spectrum of colors visible to the human eye and pixels representing tissue not in the class of interest are displayed using a different color in the color spectrum.

* * * * *